(No Model.)

J. M. GRAHAM.
PRUNING IMPLEMENT.

No. 537,284.   Patented Apr. 9, 1895.

Witnesses:
F. G. Fischer
G. Y. Thorp

Inventor:
John M. Graham
By Higdon & Higdon
Attys.

UNITED STATES PATENT OFFICE.

JOHN M. GRAHAM, OF CULVER, MISSOURI.

PRUNING IMPLEMENT.

SPECIFICATION forming part of Letters Patent No. 537,284, dated April 9, 1895.

Application filed November 20, 1894. Serial No. 529,414. (No model.)

*To all whom it may concern:*

Be it known that I, JOHN M. GRAHAM, of Culver, Bates county, Missouri, have invented certain new and useful Improvements in Pruning Implements, of which the following is a full, clear, and exact description, reference being had to the accompanying drawings, forming a part hereof.

My invention relates to pruning implements, and more particularly to that class which are engaged upon a limb of a tree and require a downward pull upon the said limb to put the cutting mechanism in operation, and the object of my invention is to provide an attachment for this class of pruning implements which will permit the cutting of the limbs without subjecting them to the strain they would sustain when pulled downward, and thereby possibly permanently injure the tree.

A further object of the invention is to provide attachments for an implement of this character which are simple, strong, durable, and inexpensive of construction.

In order that the invention may be fully understood, I will proceed to describe it with reference to the accompanying drawings, in which—

Figure 1:
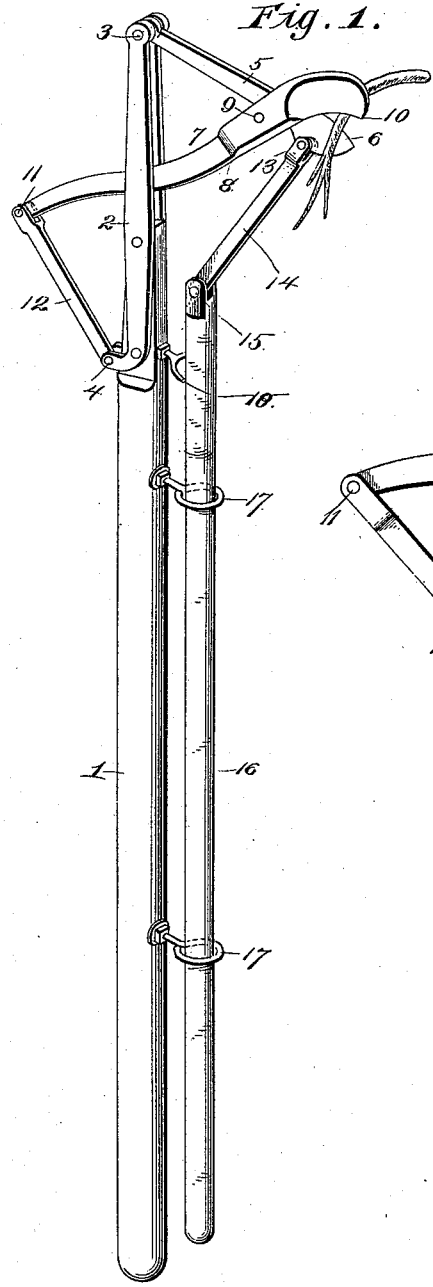
Figure 2:
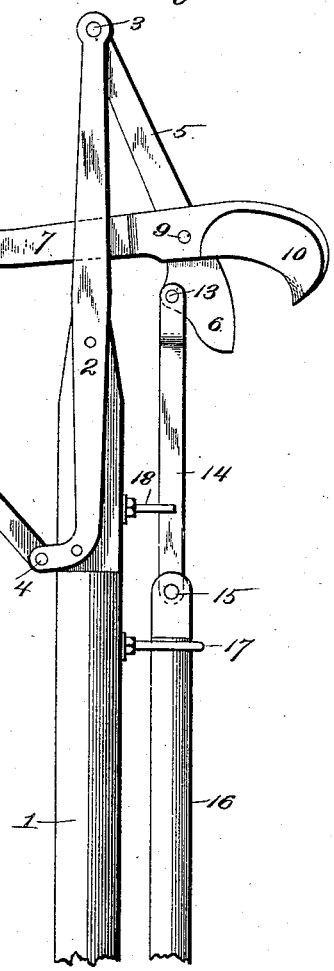

Figure 1. represents a perspective view of an implement embodying my improvements, and Fig. 2. represents an enlarged side elevation of the upper portion of the implement.

In the said drawings, 1 designates the reach, and 2 designates a pair of parallel bars, which are bolted securely to and project a suitable distance beyond the upper end of said reach, and are connected at their upper ends by the transverse bolt 3. Said bars, at their lower ends, are turned outward in the plane of the body-portion to form a pair of parallel ears, which are connected by a bolt 4. An arm 5, at one end, is pivotally mounted upon the bolt 3 between the parallel bars 2, and terminates at its opposite end in the blade 6, the cutting edge of which is presented upwardly. An arm 7 extends transversely of and between the parallel bars 2, and is provided at a suitable point with a shoulder 8, which is adapted to limit the movement of the arm in one direction, as will be understood, and said arm, adjacent to said shoulder, is pivoted at 9 to the arm 5, and outward of said pivotal point is provided with a blade 10, the cutting edge of which is presented downwardly, and therefore opposes the cutting edge of the blade 6. The opposite end of said arm is pivotally mounted upon a bolt 11, in the upper bifurcated end of a tilting-link 12, which is pivotally mounted at its lower end upon the bolt 4, between the ears of the bars 2. The blade 6 is pivotally mounted upon a bolt 13, in the bifurcated upper end of a link-bar 14, and said link-bar is pivotally mounted upon the bolt 15, in the upper bifurcated end of an auxiliary reach 16. This auxiliary reach is maintained in a position parallel with the reach 1, by means of vertically aligned eye-bolts 17, which project outwardly from said reach 1, and projecting outwardly from the same side of the handle and vertically above the said eye-bolts, is a semi-circular or forked brace 18. This brace performs no function until power is applied upon the limb to be severed and the relative positions of the reaches 1 and 16 have been changed by the downward movement of the reach 1. This movement, it will be apparent, causes the upper eye-bolt 17 to move downward upon the auxiliary reach 16 some distance, and the forked brace 18 to move downward and engage the upper end of said auxiliary reach 16, so that the upper portion of said auxiliary reach will be relieved of the greater part of the strain imposed upon it in the cutting operation. If this brace were not provided it will be apparent that said auxiliary reach 16, projecting a suitable distance above the topmost eye-bolt, would bend and possibly break under such strain.

In severing a stout limb, the reaches are manipulated to cause the cutting mechanism to assume approximately the position shown in Fig. 2, with the cutting-blades engaging opposite sides of the limb. The auxiliary reach 16 is now held by the operator as nearly as possible in the position shown, while the handle 1 is pulled downwardly. By pressing or holding the auxiliary reach 16 as nearly as possible from longitudinal movement, it will be apparent that in the cutting operation the blades fulcrum upon the limb without moving the same to any extent either upward or downward, and that the downward movement of said reach 1 and its component or rigidly carried parts, causes the said reach and the bars 2 to move bodily in a downwardly inclined plane away from said limb, and therefore causes the cutting-arm 5 to move nearer to a horizontal position, and the tilting-link 12 to move nearer to a vertical position without materially changing the position of the cutting-arm 7, which is approximately horizontal during the entire operation, due to its swinging slightly upon its fulcrum point upon the limb, as will be understood. It will be apparent, also, that this outward movement in a downwardly inclined plane of the reach 1 and the bars 2 is equivalent to an upward and inward movement in the same inclined plane, or approximately the same, of the arm 7, so that said arm, as the cutting operation is completed, occupies a point nearer the upper end of the guide-space formed between said bars 2, and its pivoted end 11 has approached the reach 1. It will be apparent, furthermore, that with each operation the link 12 is tilted in one direction or the other, toward or from the reach, so that it will be obvious that the arm 7 not only has a movement transverse of the bars 2, but also varies its position vertically between said bars.

When it is desired to sever twigs or light limbs it is only necessary to properly arrange the cutting edges of the knives relative thereto and to move the reaches in opposite directions, or to pull downward upon the reach 1, or push upward the auxiliary reach 16, as will be understood.

By locating the shoulder 8 at some distance from the pivot 9, it will be observed that said shoulder, engaging one of the guide-bars 2, holds the knife-arm 5 at an angle to the said side-bars sufficient to provide the requisite amount of leverage to render the beginning of the cutting operation comparatively easy. If this shoulder were not provided it will be apparent that the arm 5 would swing nearly to a vertical position, and would therefore provide such a small leverage that it would be rather difficult to put the cutting mechanism in operation.

From the above description, it will be apparent that I have produced a pruning implement whereby limbs or twigs will not be rent or broken in the cutting operation, and which is simple, strong, durable, and inexpensive of construction, and easy of manipulation.

Having thus described my invention, what I claim as new, and desire to secure by Letters Patent, is—

1. A pruning implement, comprising a reach, bars secured thereto, a knife pivoted at the upper end of said bars, a second knife pivoted to the first-mentioned knife, a tilting-link pivotally connecting the last-mentioned knife with the reach, a second link pivotally connected to said first-mentioned knife, and an auxiliary reach pivotally connected to said last-mentioned link, and suitably guided to prevent movement of the same in any but a longitudinal direction, substantially as set forth.

2. In a pruning-implement, the combination of a reach, parallel guide-bars secured thereto and projecting beyond its upper end, an arm pivoted between the upper ends of said guide-bars provided with an upwardly disposed cutting edge, a second arm extending transversely through the guide-space formed by the said guide-bars provided with a downwardly disposed cutting-edge and pivoted to said first-mentioned arm, and provided also with a shoulder to limit the movement or swing of the said cutting-mechanism in one direction, and a tilting link pivotally connecting the lower ends of said guide-bars with the opposite end of the arm projecting through said guide-space, with an auxiliary reach, eye-bolts projecting from the main reach and embracing said auxiliary reach to guide the same, a forked brace projecting from said main reach a suitable distance above the topmost eye-bolt, and a link pivotally connecting the first-mentioned knife-arm with the upper end of said auxiliary reach, substantially as set forth.

In testimony whereof I affix my signature in the presence of two witnesses.

JOHN M. GRAHAM.

Witnesses:
W. F. DUVALL,
H. E. PERCIVAL.